US009215843B2

(12) United States Patent
Cooksey et al.

(10) Patent No.: US 9,215,843 B2
(45) Date of Patent: Dec. 22, 2015

(54) CONVERSION KIT FOR AUTOMATING FOLDABLE AND UNFOLDABLE GRAIN TANK EXTENSIONS OF AN AGRICULTURAL COMBINE

(71) Applicant: CNH America LLC, New Holland, PA (US)

(72) Inventors: William Lee Cooksey, Geneseo, IL (US); Orlin Wayne Johnson, Geneseo, IL (US); Tulugu Venugopala Rao, Moline, IL (US)

(73) Assignee: CNH Industrial America LLC, New Holland, PA (US)

( * ) Notice: Subject to any disclaimer, the term of this patent is extended or adjusted under 35 U.S.C. 154(b) by 232 days.

(21) Appl. No.: 13/848,615

(22) Filed: Mar. 21, 2013

(65) Prior Publication Data

US 2013/0252681 A1 Sep. 26, 2013

Related U.S. Application Data

(60) Provisional application No. 61/685,849, filed on Mar. 26, 2012.

(51) Int. Cl.
*A01F 12/60* (2006.01)
*A01D 41/12* (2006.01)

(52) U.S. Cl.
CPC .................. *A01D 41/1226* (2013.01)

(58) Field of Classification Search
CPC ............ A01D 46/082; A01D 41/1226; A01D 41/1208; A01C 15/005; A01C 15/006; B65D 88/005; B65D 88/52
USPC .............. 460/119, 23; 296/100.01, 15, 26.07; 56/14.7; 414/505, 502
See application file for complete search history.

(56) References Cited

U.S. PATENT DOCUMENTS

| | | | | | |
|---|---|---|---|---|---|
| 4,106,649 | A | * | 8/1978 | Nelson et al. ................. | 414/505 |
| 4,466,549 | A | * | 8/1984 | Hanaway ..................... | 220/4.03 |
| 5,151,064 | A | * | 9/1992 | Damman et al. ............... | 460/23 |
| 5,427,572 | A | * | 6/1995 | Deutsch et al. .............. | 460/119 |
| 6,074,298 | A | * | 6/2000 | Majkrzak et al. ............. | 460/119 |

(Continued)

FOREIGN PATENT DOCUMENTS

EP 1197134 A1 4/2002

*Primary Examiner* — Árpád Fábián Kovács
(74) *Attorney, Agent, or Firm* — Patrick M. Sheldrake

(57) ABSTRACT

A conversion kit for automating a foldable and unfoldable grain tank extension for an agricultural combine is provided. The conversion kit includes a first bracket assembly for attaching to a first grain tank extension, a second bracket assembly for attaching to a second grain tank extension and a control actuator. The control actuator extends between and is operatively connected to the first and second bracket assemblies for moving the first and second brackets between a folded position and an unfolded position. A torque rod assembly extends between and is operatively connected to third and fourth grain tank extensions. The torque rod assembly is rotatable to pivotally move the third and fourth grain tank extensions between a folded position and an unfolded position.

21 Claims, 15 Drawing Sheets

(56) References Cited

U.S. PATENT DOCUMENTS

| | | | |
|---|---|---|---|
| 6,126,220 A * | 10/2000 | Brasher | 296/26.04 |
| 6,206,779 B1 * | 3/2001 | Gerber et al. | 460/23 |
| 6,508,705 B1 | 1/2003 | Van Overschelde | |
| 6,679,772 B2 | 1/2004 | Johnson et al. | |
| 6,692,352 B2 | 2/2004 | Gerber et al. | |
| 7,018,290 B2 * | 3/2006 | Ramon et al. | 460/119 |
| 7,101,280 B2 * | 9/2006 | Colpaert | 460/119 |
| 7,585,214 B1 | 9/2009 | Johnson et al. | |
| 7,645,109 B2 | 1/2010 | Stukenholtz et al. | |
| 8,029,346 B2 | 10/2011 | Sprau | |
| 8,113,565 B2 | 2/2012 | Zeuner et al. | |
| 2003/0232634 A1 * | 12/2003 | Johnson et al. | 460/119 |
| 2004/0033823 A1 * | 2/2004 | Stephens et al. | 460/119 |
| 2008/0261672 A1 * | 10/2008 | Stukenholtz et al. | 460/119 |
| 2009/0270149 A1 * | 10/2009 | Sprau | 460/119 |
| 2011/0095554 A1 * | 4/2011 | Zeuner et al. | 296/15 |
| 2012/0155996 A1 | 6/2012 | Horst | |
| 2013/0196724 A1 * | 8/2013 | Barnes et al. | 460/119 |

* cited by examiner

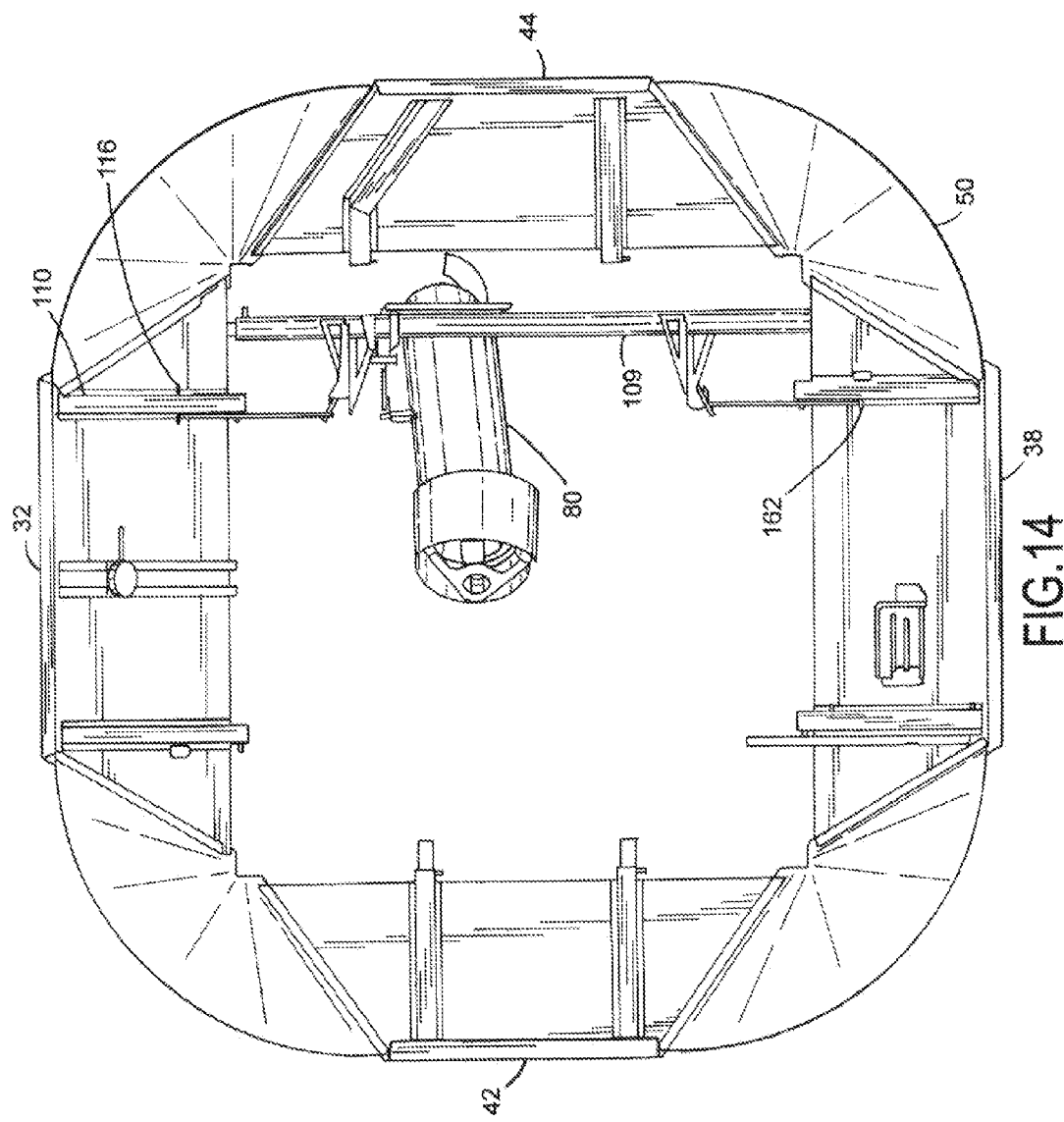

CONVERSION KIT FOR AUTOMATING FOLDABLE AND UNFOLDABLE GRAIN TANK EXTENSIONS OF AN AGRICULTURAL COMBINE

BACKGROUND OF THE INVENTION

The present invention relates generally to a foldable and unfoldable grain tank extension for an agricultural combine. In particular, the present invention relates to a conversion kit for automating foldable and unfoldable grain tank extensions for an agricultural combine.

In the past, when it was desired to increase the capacity of the grain tank of an agricultural harvesting machine such as a combine, a rigid walled structure was sometimes, if not typically, affixed around an upwardly facing opening of the grain tank so as to extend upwardly therefrom. Such known extensions generally provided satisfactory grain capacity increasing utility, but suffered from various shortcomings. Due to the increase in overall height of the combines when such structures were installed, the height of the combine often exceeded government imposed height limitations for road travel, as a consequence of which removal and reinstallation of such structures was often necessary, with attendant expenditures of time and efforts.

It was also known to provide an extendible cover for the upwardly facing opening of a grain tank, which cover was movable directly upwardly from the periphery of the opening along at least two sides of the grain tank so as to expand the grain holding capacity. However, since at least two sides of such known devices extended only directly upwardly, and not outwardly, from the upward opening, the increased grain holding capacity was more limited than was desirable.

Thus, there is still a need for a conversion kit capable of converting a manual foldable grain tank extension to an automated foldable and unfoldable grain tank extension to address the aforementioned deficiencies of typical combines. Such a need is satisfied by the present conversion kit for automating foldable and unfoldable grain tank extensions for an agricultural combine.

BRIEF SUMMARY OF THE INVENTION

In accordance with a preferred embodiment, the present invention provides a conversion kit for automating foldable and unfoldable grain tank extensions for an agricultural combine. The conversion kit includes a first bracket assembly, a second bracket assembly, a control actuator, and a torque rod assembly. The first bracket assembly is attachable to a first grain tank extension and includes a first bracket for securing to the first grain tank extension. The second bracket assembly is attachable to a second grain tank extension and includes a second bracket for securing to the second grain tank extension. The control actuator extends between and is operatively connected to the first and second bracket assemblies for moving the first and second brackets between a folded position and an unfolded position. The torque rod assembly extends between and is operatively connected to third and fourth grain tank extensions. The torque rod assembly includes a torque tube operatively connected to the control actuator to pivotally move the third and fourth grain tank extensions between a folded position and an unfolded position.

In accordance with another aspect of the preferred embodiment, the present invention provides a conversion kit for automating a foldable and unfoldable grain tank extension for an agricultural combine. The conversion kit includes a first bracket assembly, a second bracket assembly, a control actuator, and a torque rod assembly. The first bracket assembly attaches to a first grain tank extension and includes a first planar quadrilateral-shaped bracket for securing to the first grain tank extension, and a first linkage for linking to the first bracket. The second bracket assembly attaches to a second grain tank extension and includes a second planar quadrilateral-shaped bracket for securing to the second grain tank extension, and a second linkage for linking to the second bracket. The control actuator extends between and is operatively connected to the first and second linkages for moving the first and second brackets between a folded position and an unfolded position. The torque rod assembly is operatively connected to third and fourth grain tank extensions and the control actuator. The torque rod assembly includes a torque tube extending between the third and fourth grain tank extensions, and third and fourth linkages for linking the torque tube to the third and fourth grain tank extensions. The torque tube is rotatable to pivotally move the third and fourth grain tank extensions between a folded position and an unfolded position.

In accordance with yet another aspect of the preferred embodiment, the present invention provides an automated unfoldable and foldable extension for increasing the grain holding capacity of a grain tank of an agricultural combine. The automated unfoldable and foldable extension includes a plurality of extension panels, a first bracket assembly, a second bracket assembly, a control actuator, and a torque rod assembly. The plurality of extension panels is mounted for pivotal movement about the grain tank. The first bracket assembly attaches to a first extension panel and includes a first planar quadrilateral-shaped bracket for securing to the first extension panel, and a first linkage for linking to the first planar quadrilateral-shaped bracket. The second bracket assembly attaches to a second extension panel and includes a second planar quadrilateral-shaped bracket for securing to the second extension panel, and a second linkage for linking to the second planar quadrilateral-shaped bracket. The control actuator extends between and is operatively connected to the first and second linkages for moving the first and second planar quadrilateral-shaped brackets between a folded position and an unfolded position. The torque rod assembly is operatively connected to third and fourth extension panels and the control actuator. The torque rod assembly includes a torque tube extending between the third and fourth grain tank extensions, and third and fourth linkages for linking the torque tube to the third and fourth extension panels. The torque tube is rotatable to pivotally move the third and fourth extension panels between a folded position and an unfolded position.

BRIEF DESCRIPTION OF THE SEVERAL VIEWS OF THE DRAWINGS

The foregoing summary, as well as the following detailed description of a preferred embodiment of the present invention will be better understood when read in conjunction with the appended drawings. For the purpose of illustrating the invention, there are shown in the drawings an embodiment which is presently preferred. It should be understood, however, that the invention is not limited to the precise arrangements and instrumentalities shown.

In the drawings:

FIG. 14 is a top plan view of the foldable extension of FIG. 4 in a fully unfolded position.

DETAILED DESCRIPTION OF THE INVENTION

Reference will now be made in detail to a preferred embodiment of the present invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

The terms "grain" and "crop material" are used throughout the specification for convenience and it should be understood that these terms are not intended to be limiting. Thus, "grain" refers to that part of a crop which is harvested and separated from discardable portions of the crop material.

Figure 1:
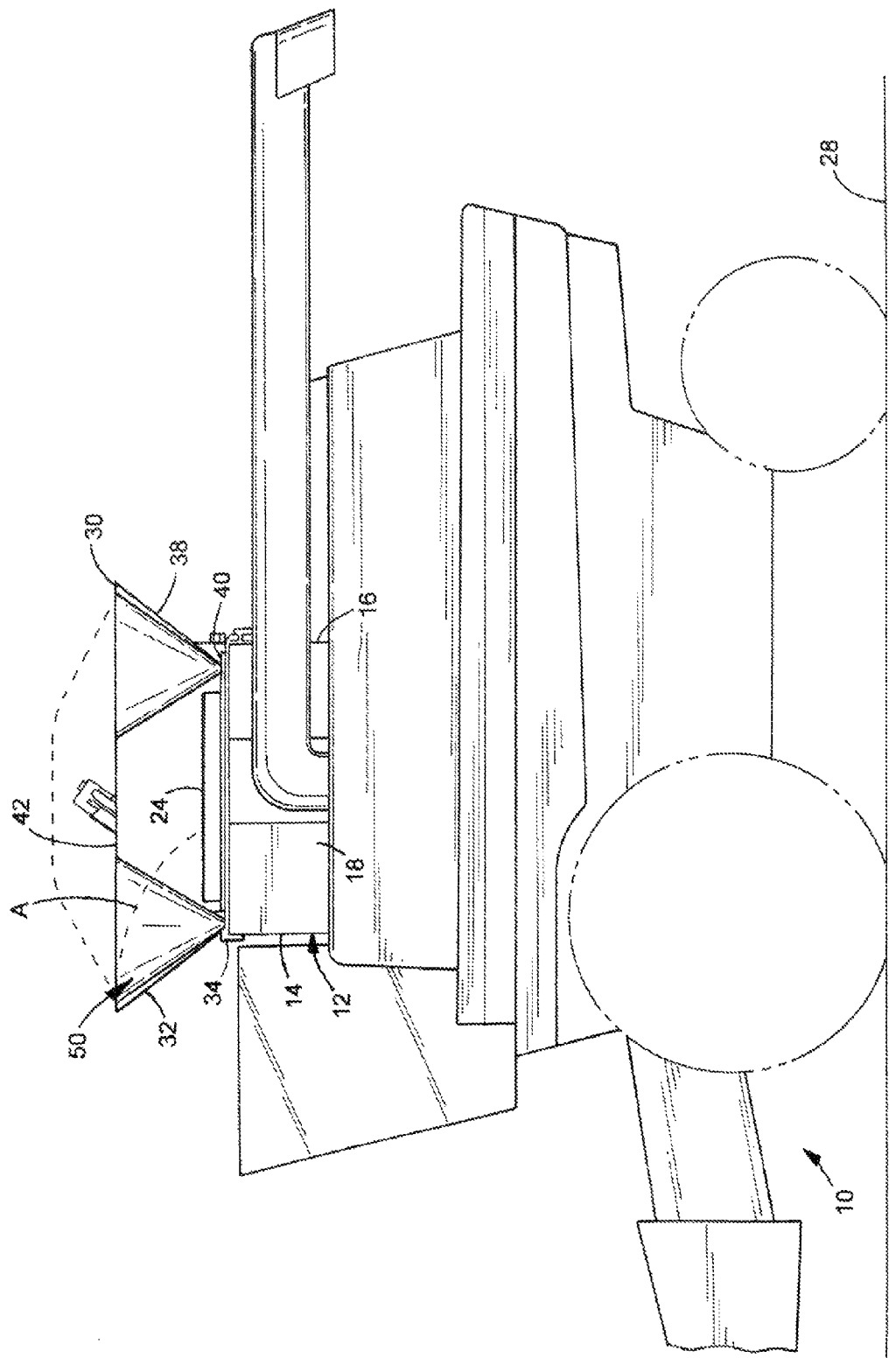
FIG. 1 is a simplified side view of a representative agricultural combine including a grain tank having a foldable extension according to the present invention, with such extension shown in a deployed or unfolded position.
Figure 2:
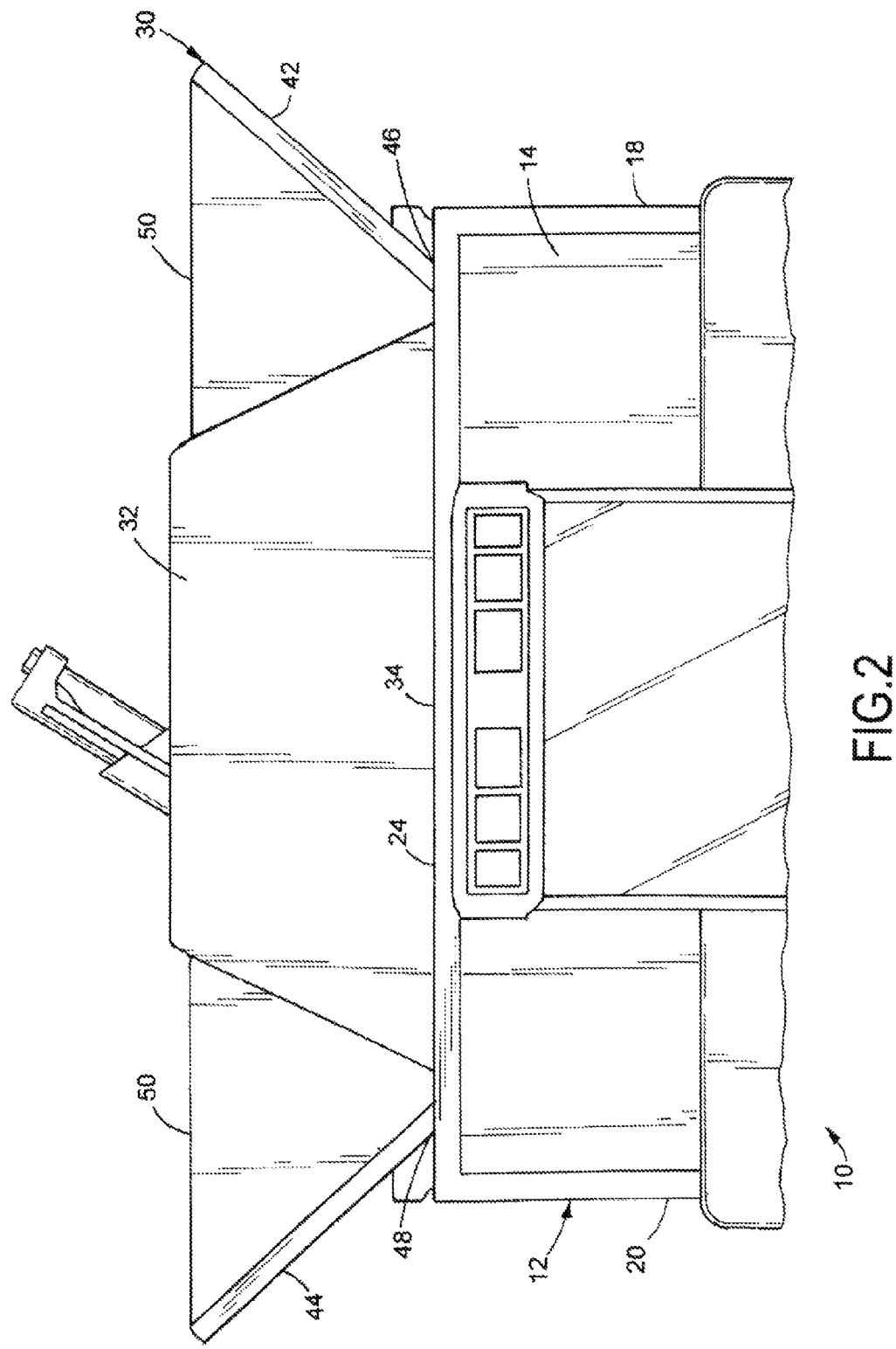
FIG. 2 is simplified fragmentary front view of the foldable extension of FIG. 1.
Figure 3:
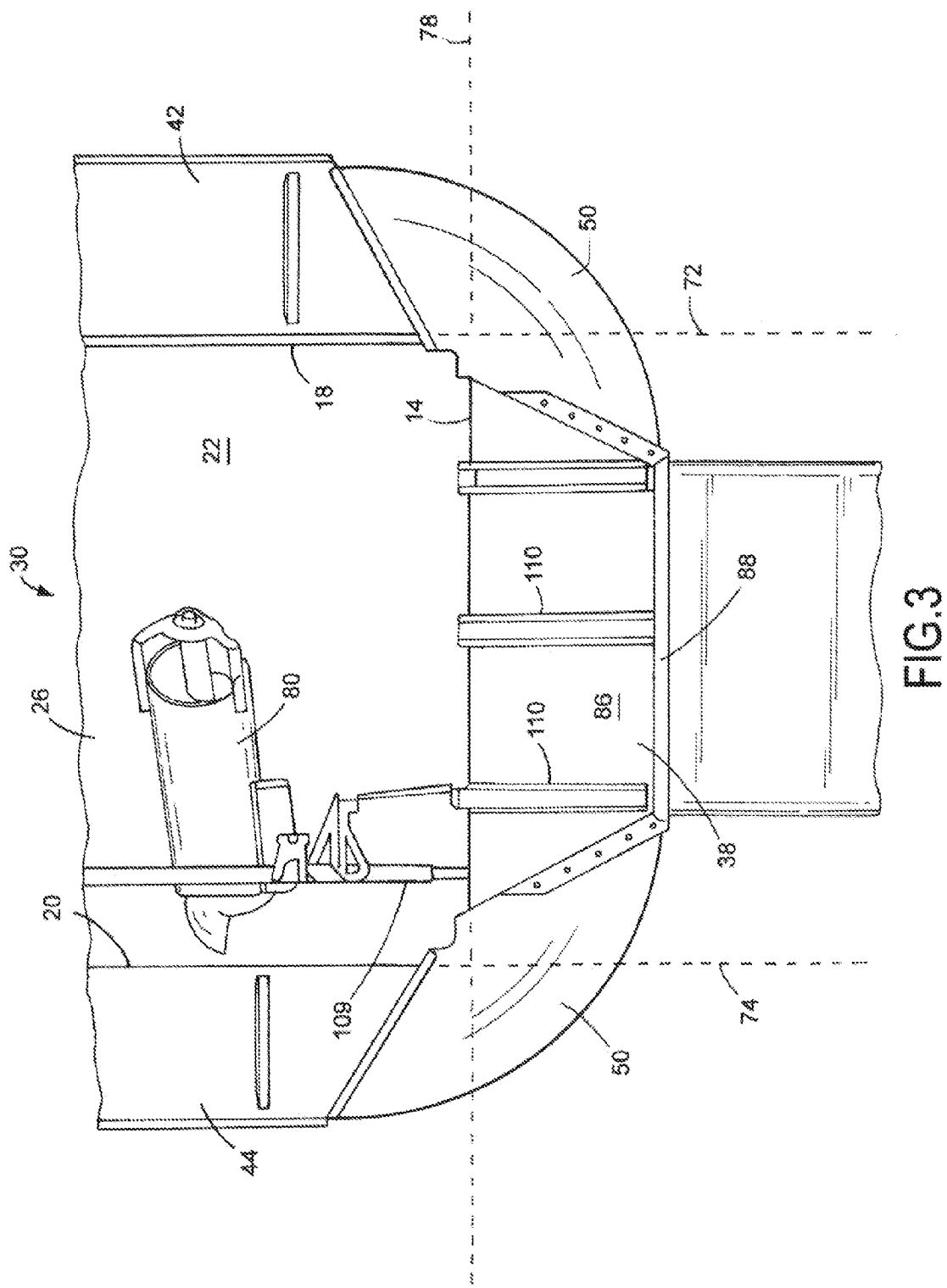
FIG. 3 is simplified fragmentary top view of the foldable extension of FIG. 1.

Referring now to the drawings, wherein like numbers refer to like items, FIGS. 1 and 2 depict a representative self-propelled agricultural combine harvesting machine 10, including an apparatus for harvesting, cleaning and conveying clean grain, such as, but not limited to, corn, wheat, or soybeans, to a grain tank 12 located atop machine 10. Grain tank 12 includes a plurality of upstanding, angularly related walls, including a forward wall 14, a rear wall 16 opposite forward wall 14, and opposed side walls 18 and 20 (FIG. 2) extending between forward and rear walls 14 and 16. Referring to FIG. 3, walls 14, 16, 18 and 20 define a rectangular shaped receptacle 22, the side-to-side dimensions of which are typically greater than the front to back dimensions, for receiving and holding grain harvested by the combine 10. Walls 14, 16, 18, and 20 additionally include a substantially continuous, rectangular upper edge 24 (FIGS. 1 and 2) defining an upper end of receptacle 22 and an upwardly facing rectangular opening 26 (FIG. 3) corresponding at least generally in horizontal extent to receptacle 22.

Upper edge 24 typically represents the highest or one of the highest points on the combine 10 relative to a surface 28 (FIG. 1) such as the ground or a road surface on which the combine 10 is located. This height is typically limited to a maximum value as dictated by a governmental entity for safe passage on public roads, under bridges and/or utility wires. However, such a maximum height poses a difficulty insofar as it thus limits the height and, thus, the grain holding capacity of the grain tank 12.

As a result, a problem that can arise, particularly when harvesting operations are being carried out in very large fields, is that, in the absence of an extension, the grain tank 12 may fill to its capacity before a section of a crop field being harvested has been completed, or when the combine 10 is at a location within a field far from a grain truck or wagon into which the grain is to be unloaded, such that the harvesting operations must be undesirably interrupted, for a longer than desired time, for the unloading of the grain tank, which actions may require significant time expenditures to drive the combine 10 to the unloading location, to unload it, and to then return it to the harvesting location. However, if a rigid, fixed extension is placed about upper edge 24 to expand the capacity of a grain tank 12, thereby minimizing to some extent the down time that would otherwise be associated with more frequent interruptions for unloading of the grain tank, and if such extension causes the overall height of the combine 10 with the mounted, fixed extension to exceed the maximum lawful height, the extension must be removed for legal passage of the combine 10 over public roads, which removal operation can be time consuming. Even if the combine 10 is not operated on public roads, such extension, because of the increase in height that results from the use thereof, may extend to such an extent that it undesirably contacts low hanging tree limbs and is damaged by such contact or causes damage to such limbs themselves.

To avoid the above-discussed problems, grain tank 12 of harvesting machine 10 includes a foldable extension 30 constructed and operable according to the teachings of the present invention. Extension 30 is foldable between a deployed or unfolded position (FIGS. 1-3, 13 and 14) extending upwardly and outwardly from grain tank 12 for substantially increasing the grain holding capacity thereof, and a folded or closed or stored position (FIGS. 4 and 5A) so as to be more easily capable of meeting overall height limitations of the combine 10 for travel over public roads and the like.

Figure 4:
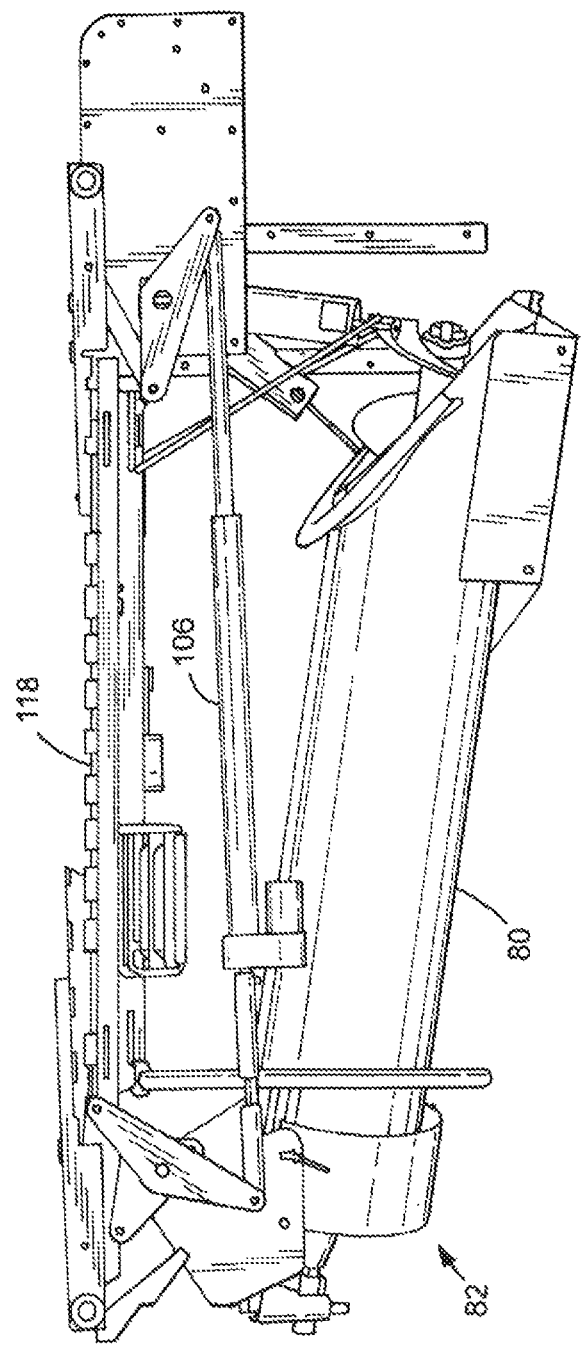
FIG. 4 is simplified fragmentary rear view of the foldable extension of FIG. 1.
Figure 5A:
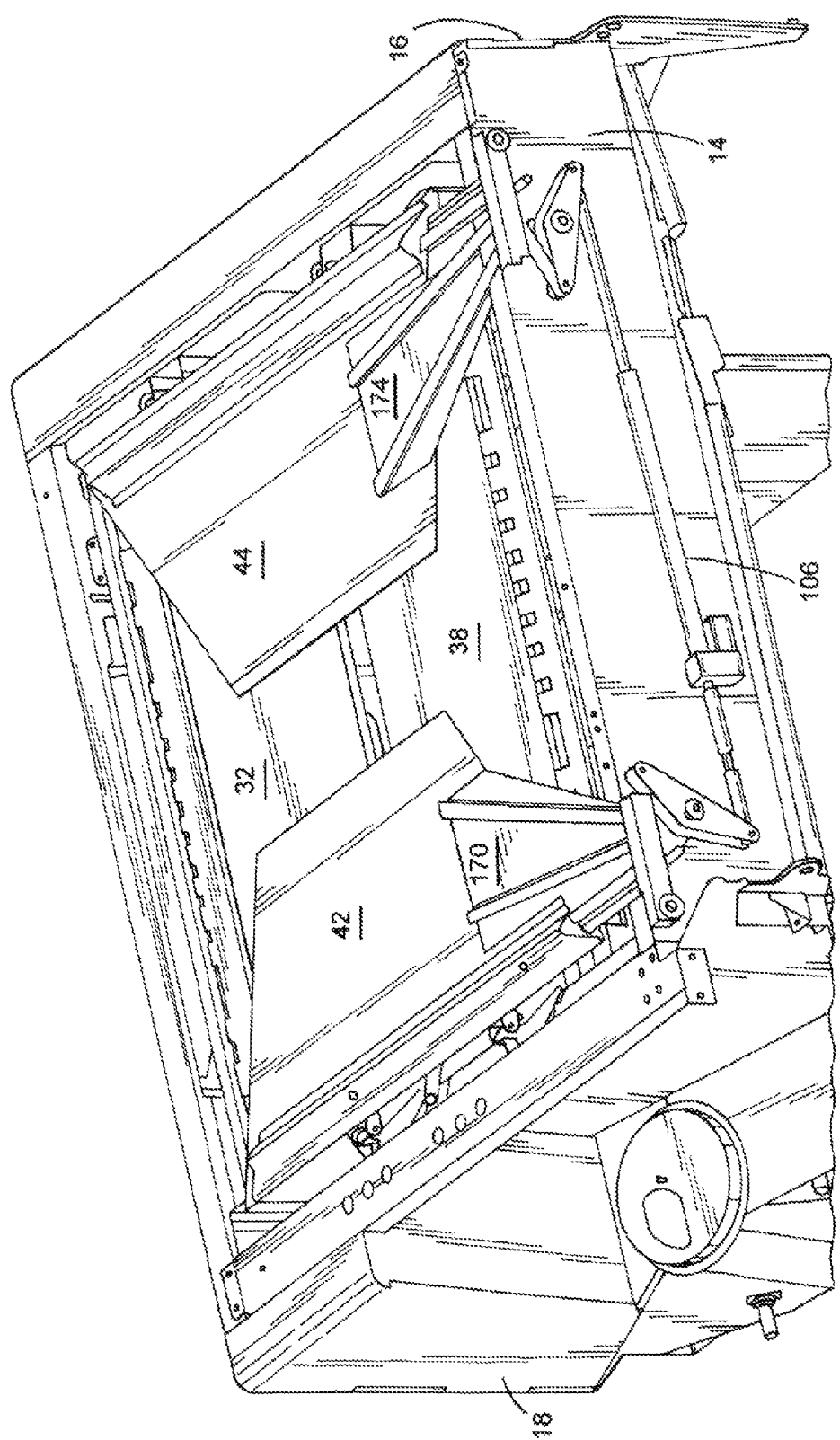
FIG. 5A is a simplified perspective view of the foldable extension of FIG. 4 with portions of a grain tank shown.
Figure 5B:
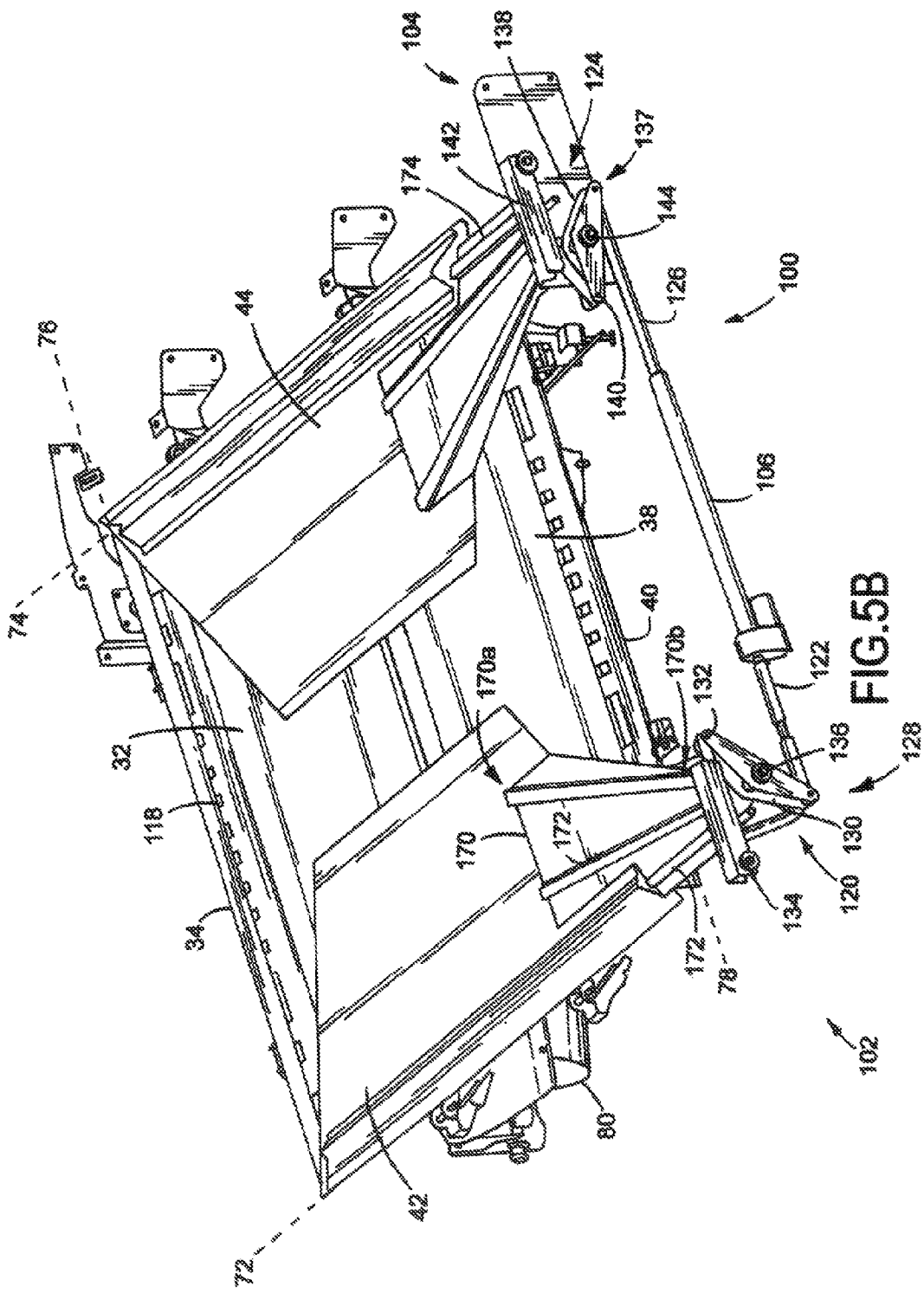
FIG. 5B is another simplified perspective view of the foldable extension of FIG. 4.

With reference most particularly to FIG. 5B, foldable extension 30 includes a forward or front extension panel 32 preferably of substantially rigid material such as sheet metal, plastic, or any other suitable material for the present application. Panel 32 has a generally horizontal lower edge portion positioned generally along that portion of upper edge 24 extending along forward wall 14, defined as the forward wall edge, and is connected to the grain tank 12, such as by a pivot assembly or joint 34, to be rotatable about an axis of rotation generally along or adjacent to such forward wall edge. Pivot assembly or joint 34 can take many suitable forms, including a rotatable shaft or tube operatively associated with or connected to the panel 32, or any suitable hinge or hinge-type device, such as a plastic living hinge, a piano hinge, multiple hinges, or other suitable hinging or pivoting elements, operable to enable pivotal movement of panel 32 between a deployed position (FIGS. 1-3) in which such panel 32 is oriented at an obtuse, interior angle to horizontal, denoted by angle A in FIG. 1, and a folded position as generally shown in FIGS. 4-5B, discussed hereinafter.

Foldable extension 30 also includes a rear extension panel 38 located opposite front panel 32, which rear panel 38 is preferably likewise constructed of a substantially rigid material such as a metal or plastic, and having a lower edge portion positioned generally along that portion of upper edge 24 extending along rear wall 16, defined as the rear wall edge, and is connected to the grain tank 12, such as by a pivot assembly or joint 40, to be rotatable about an axis of rotation generally along or adjacent to such rear wall edge. As with pivot assembly or joint 34, pivot assembly or joint 40 can take many suitable forms operable to enable pivotal movement of panel 38 between a deployed position (FIGS. 1-3) in which such panel 38 is oriented at an obtuse, interior angle to horizontal, similar to, but not necessarily the same as, that denoted by angle A in FIG. 1, and a folded position as generally shown in FIGS. 4-5B, discussed hereinafter.

With reference now, also, to FIG. 3, left and right extension panels 42, 44, which are also preferably constructed of a substantially rigid sheet metal or plastic material, are located between front and rear extension panels 32 and 38 along opposite sides of grain tank 12, above side walls 18 and 20, respectively, and have lower edge portions positioned generally along those portions of upper edge 24 extending along left and right walls 18 and 20, defined as left and right wall edges, respectively, and are connected to the grain tank 12, such as by a pivot assemblies or joints 46 and 48 (FIG. 2), to be rotatable about respective axes of rotation generally along or adjacent to such left and right wall edges. As with pivot assemblies or joints 34 and 40, pivot assemblies or joints 46 and 48 can take many suitable forms operable to enable pivotal movement of panel 42, 44 between a deployed position (FIGS. 1-3) in which such panels 42 and 44 are oriented at obtuse, interior angles to horizontal, similar to, but not necessarily the same as, that denoted by angle A in FIG. 1, and a folded position as generally shown in FIGS. 4-5B, discussed hereinafter.

For purposes of further discussion herein, references to inner edges or inner portions or the like of extension panels are intended to refer to those edges or portions of the panels that are closer to the top of the grain tank 12 when extension 30 is unfolded and references to outer edges or outer portions or the like of extension panels are intended to refer to those edges or portions of the panels that are farther from the top of the grain tank 12 when extension 30 is unfolded. In general, each of the extension panels 32, 38, 42 and 44, are operably pivotally connected along, near, or at their inner edges or sides to the grain tank 12, generally along, at, or near upper edges thereof.

Similarly, references to inner surfaces of extension panels are intended to refer to those surfaces that are closer to the top of the grain tank 12, and facing generally inwardly towards the grain tank 12, when extension 30 is folded and references to outer surfaces of extension panels are intended to refer to those surfaces that are farther from the top of the grain tank 12, and facing generally outwardly from the grain tank 12, when extension 30 is folded.

Foldable extension 30 further includes a plurality of pliable corner pieces or panels 50 (FIGS. 3, 13 and 14) that extend between and enclose, respectively, corner gaps located between the adjacent panels 32, 38, 42 and 44. As shown in FIG. 3, representative corner panels 50 extend between panel 38 and panels 42 and 44. Similar corner panels would be employed to close the corner gaps between the adjacent panels 32, 42 and 44. As will be appreciated from U.S. Pat. No. 6,679,772, the entire disclosure of which is incorporated by reference herein, the configurations of the lateral side portions of the panels 32, 38, 42 and 44 and of the corner panels 50 and their points of connection to such panels 32, 38, 42 and 44 may vary from the particular configuration depicted in FIG. 3, and such corner panels may take various forms and be constructed of various materials and include various features to facilitate the folding and unfolding of the extension 30. The corner panels 50 of FIG. 3 are connected to panels 32, 38, 42 and 44 at locations generally along or near the lateral side portions thereof at locations such that, as extension 30 is unfolded, corner panels 50 stretch or fan or expand to extend between extension panels 32, 38, 42 and 44 to effectively seal the corner gaps between such panels when extension 30 is unfolded into its unfolded or deployed position and such that, as extension 30 is folded, corner panels 50 compress or fold or contract to permit an ordered folding of the extension panels into a stacked arrangement, as will be further discussed hereinafter.

Figure 6:
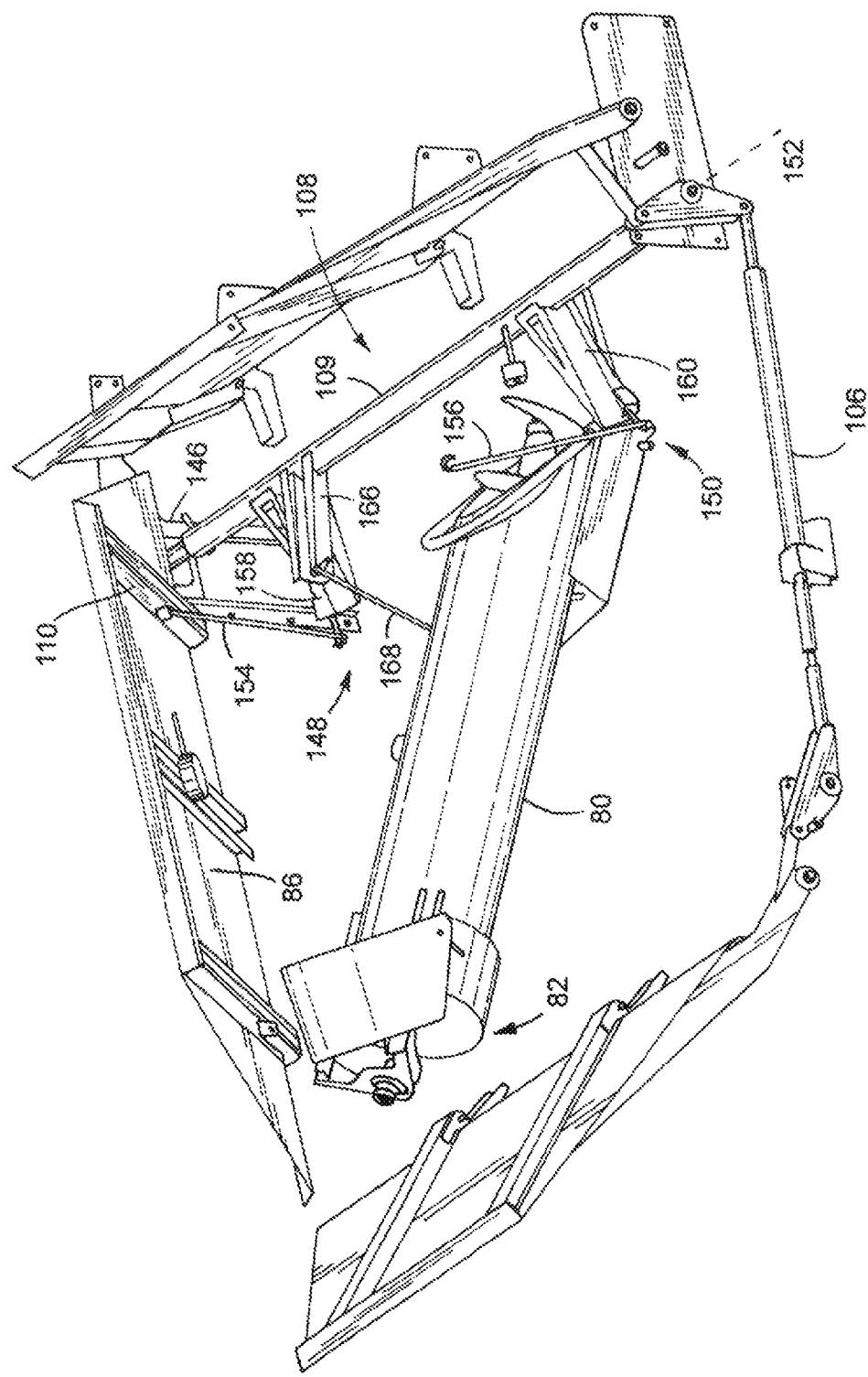
FIG. 6 is a simplified fragmentary perspective view of the foldable extension of FIG. 4 in a partially unfolded position.
Figure 7:
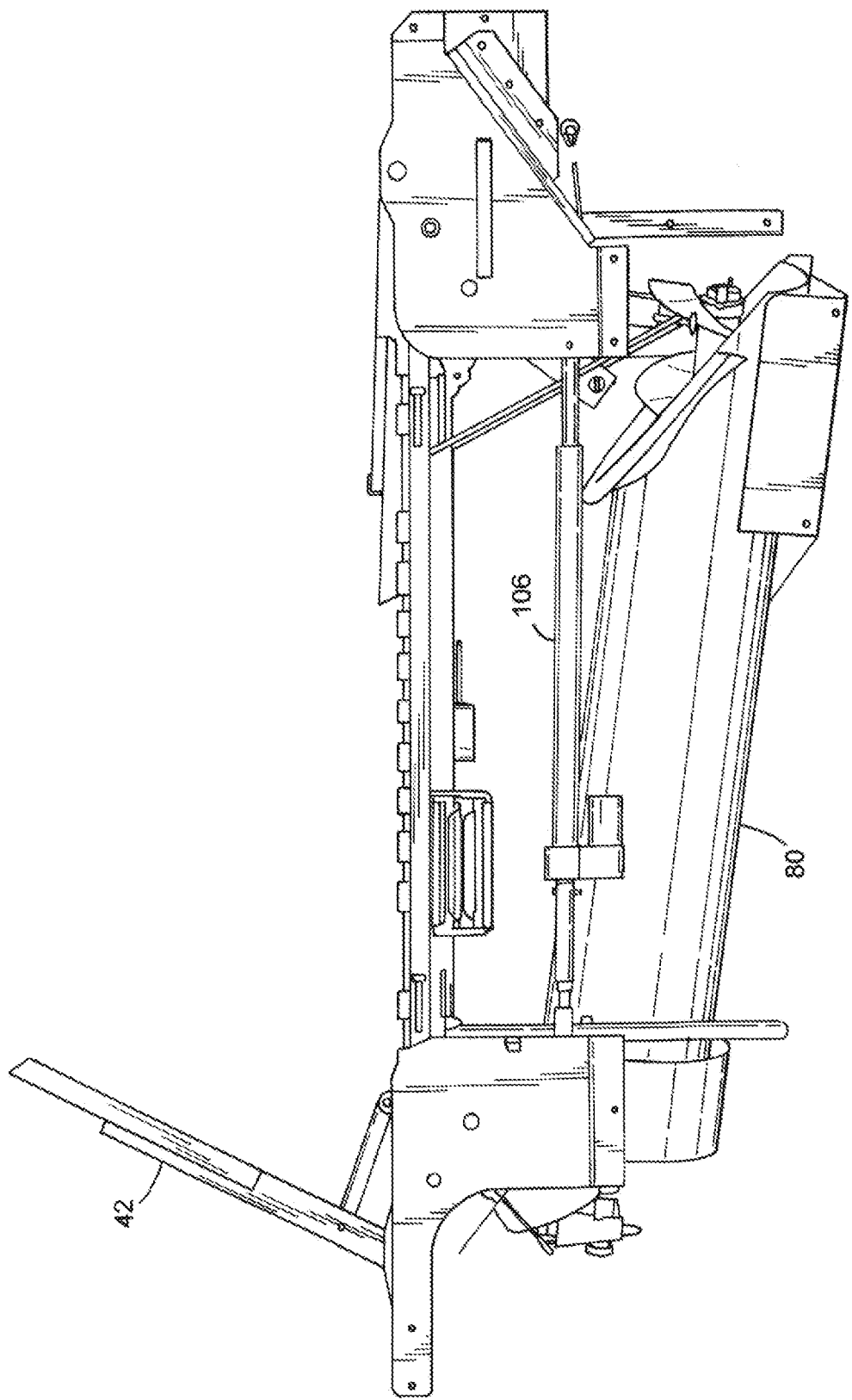
FIG. 7 is a simplified fragmentary rear view of the foldable extension of FIG. 4 in a partially unfolded position.
Figure 8:
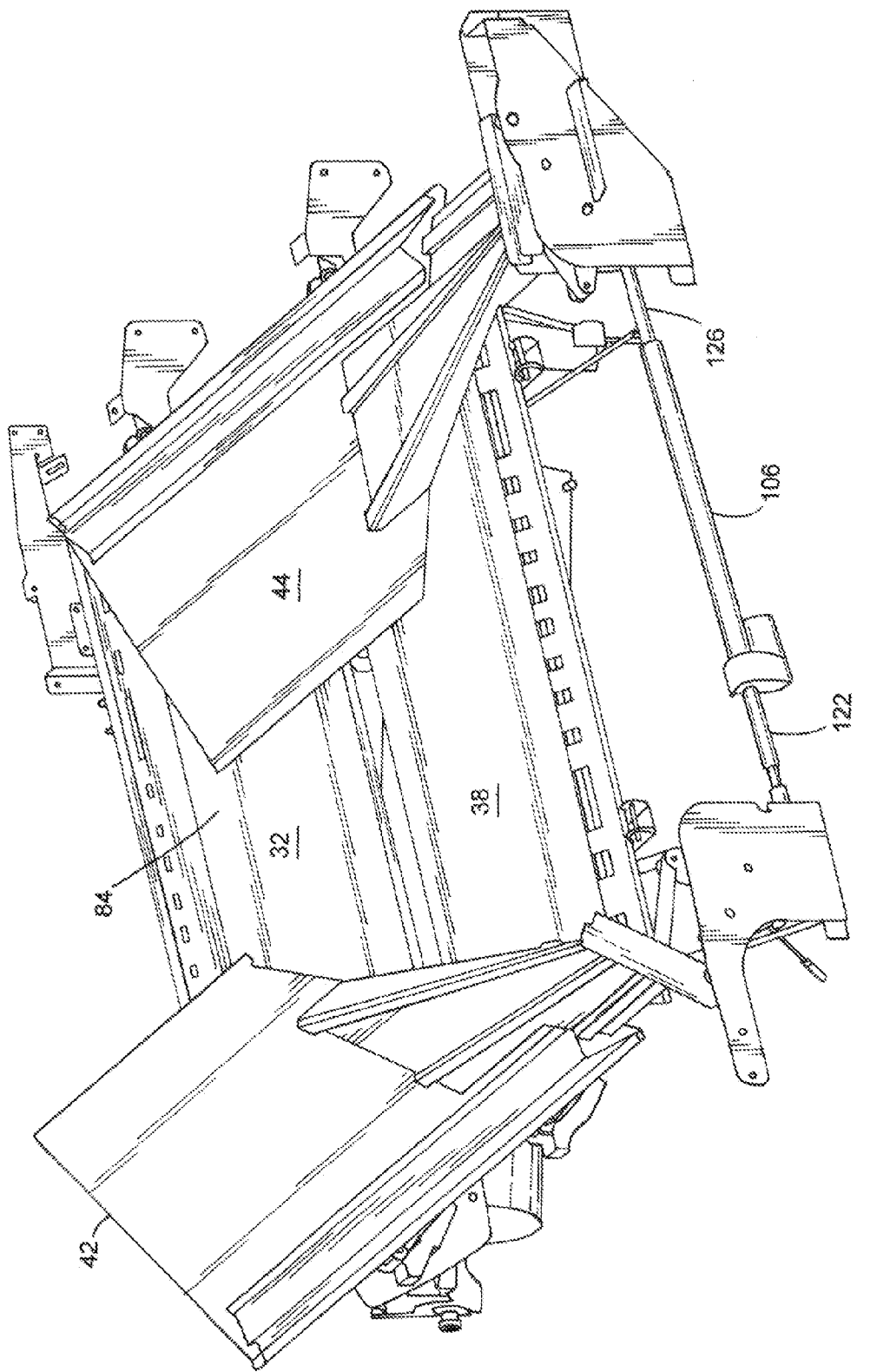
FIG. 8 is another simplified fragmentary perspective view of the foldable extension of FIG. 4 in a partially unfolded position.
Figure 9:
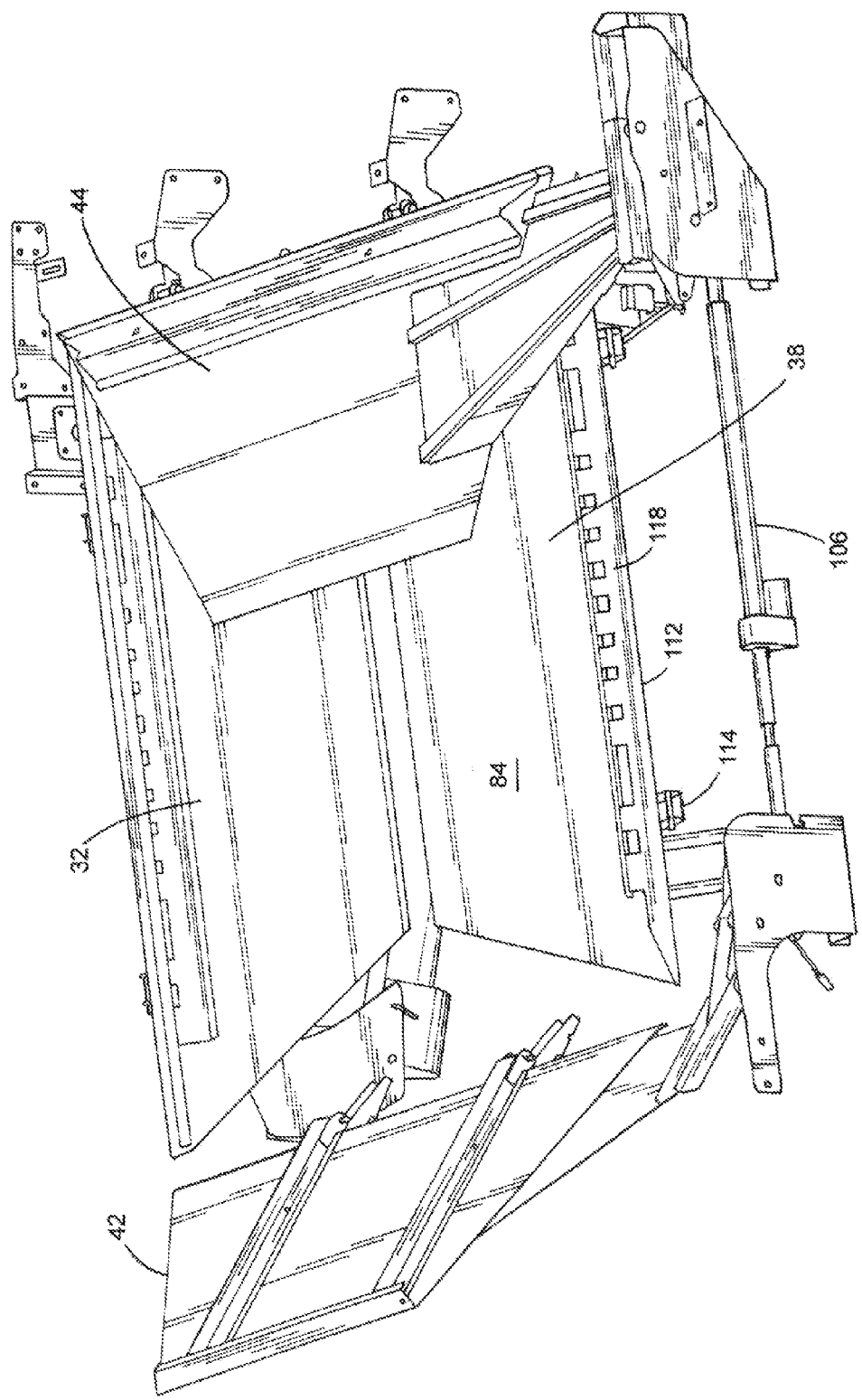
FIG. 9 is yet another simplified fragmentary perspective view of the foldable extension of FIG. 4 in a partially unfolded position.
Figure 10:
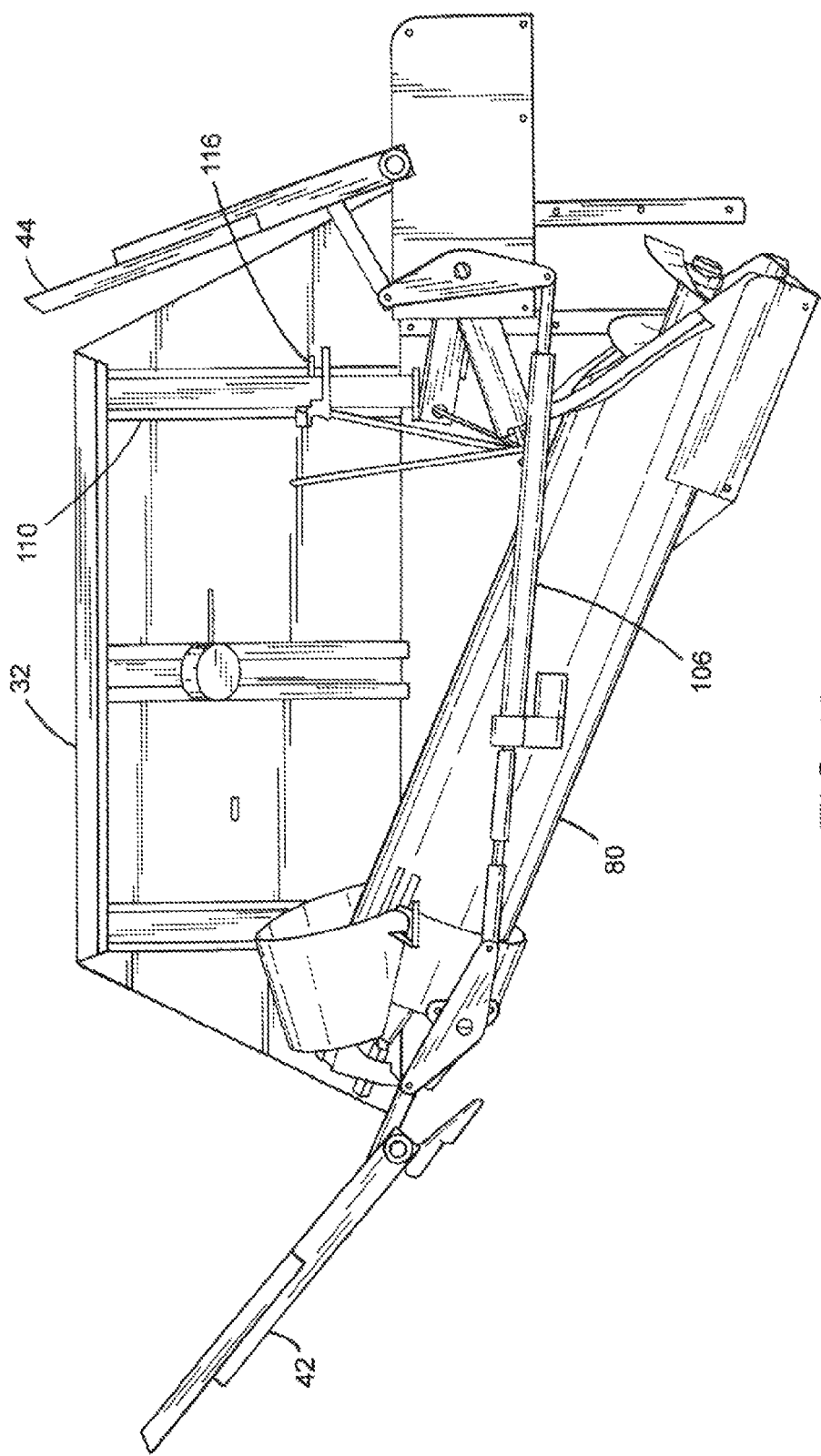
FIG. 10 is another simplified fragmentary rear view of the foldable extension of FIG. 4 in a partially unfolded position.
Figure 11:
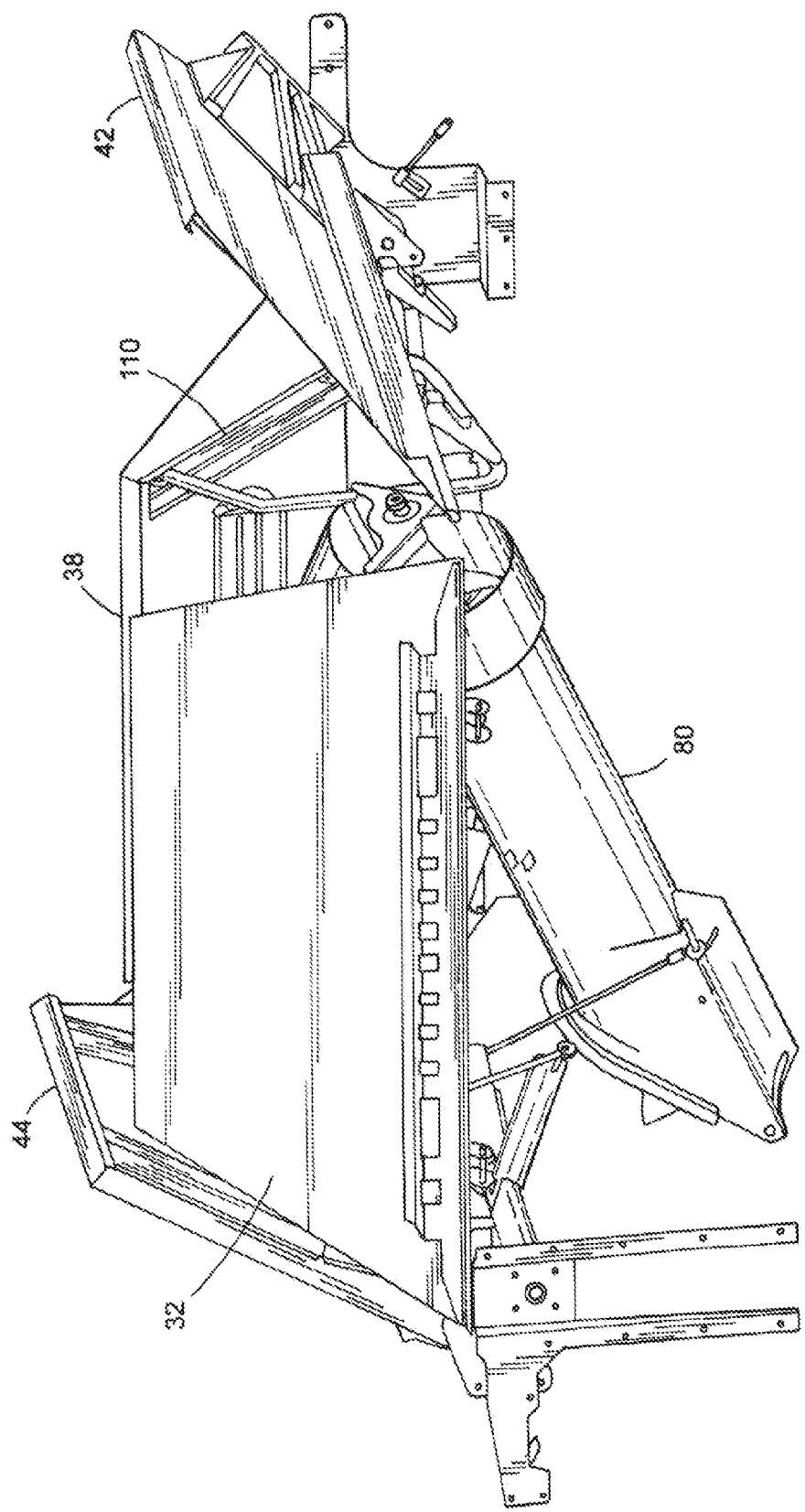
FIG. 11 is a simplified fragmentary front perspective view of the foldable extension of FIG. 4 in a partially unfolded position.
Figure 12:
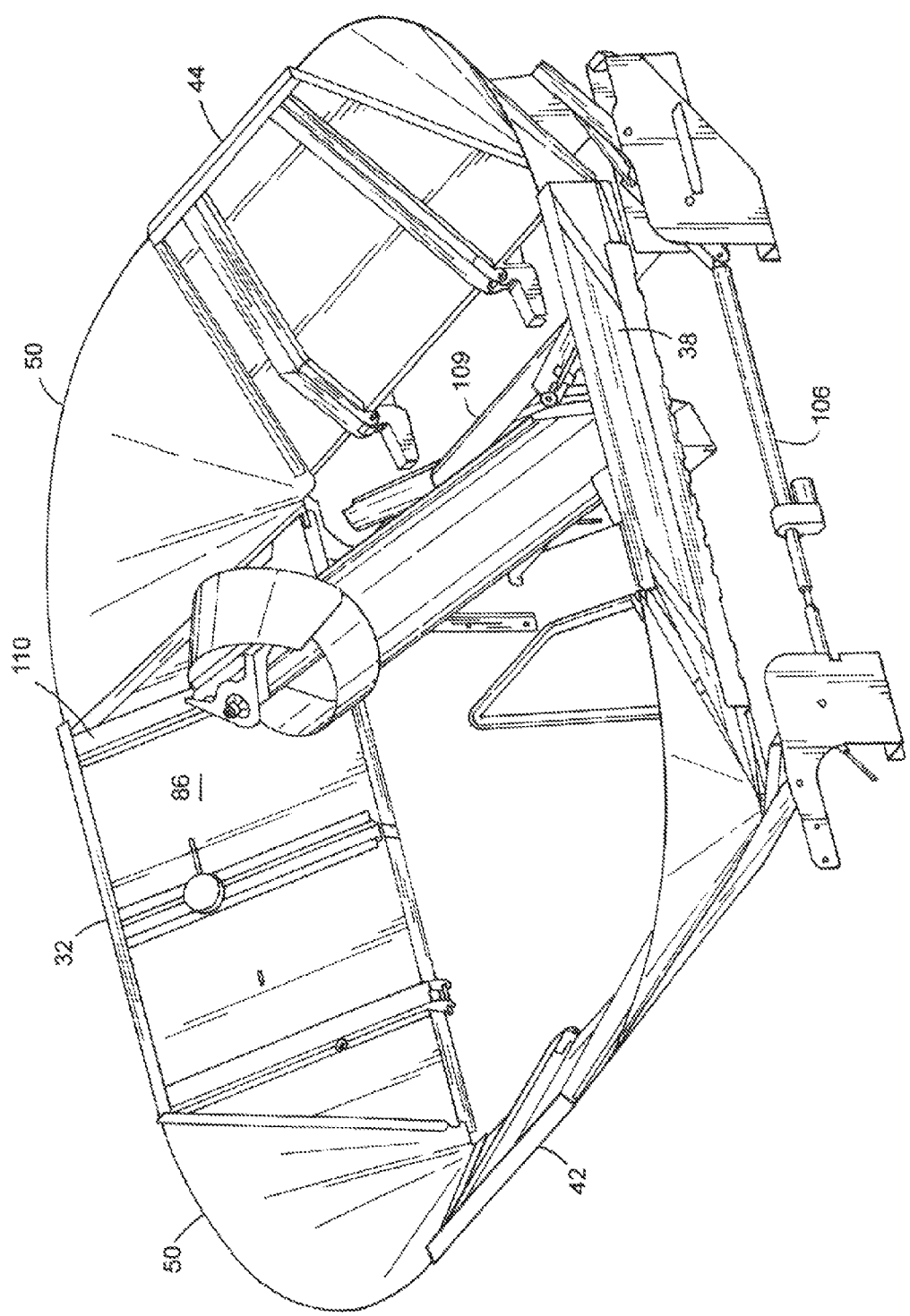
FIG. 12 is a fragmentary perspective view of the foldable extension of FIG. 4 in a fully unfolded position.
Figure 13:
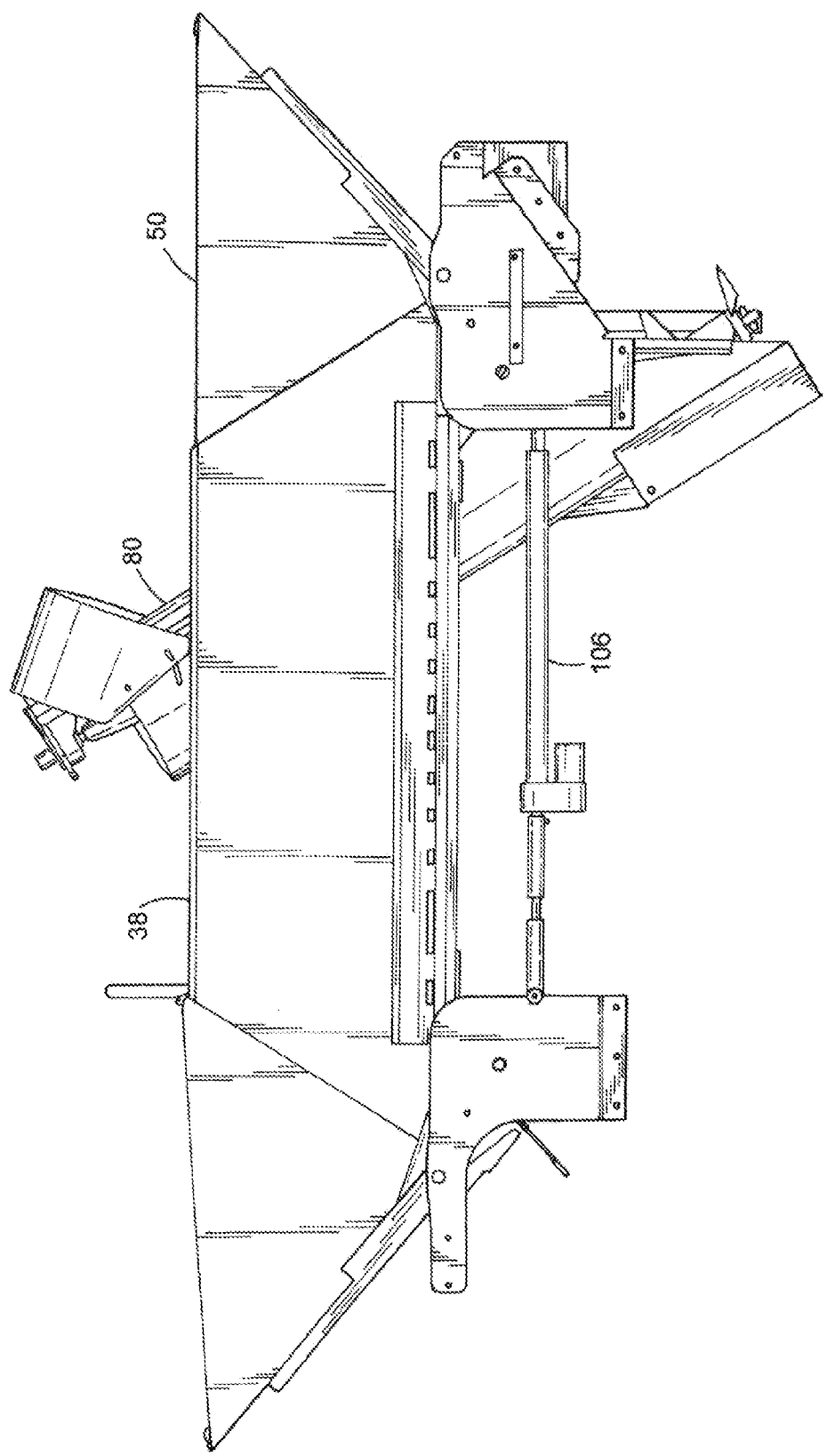
FIG. 13 is a simplified fragmentary rear elevation view of the foldable extension of FIG. 4 in a fully unfolded position.

As has been previously noted, FIG. 4 depicts the extension 30 in its folded position, when viewed from the rear, with the extension panels 32, 38, 42 and 44 disposed in a stacked, overlaying arrangement. For purposes of clarity, including in the depiction and discussion of the operation of the linkage system for the extension 30, the corner pieces 50 and the grain tank 12 are not shown in the figure and in many of the other drawing figures herewith. FIG. 5A is a perspective view of the components of FIG. 4 and FIG. 6 is a perspective view of such components with panels in a partially unfolded state. FIGS. 7-9 are illustrations of the components of FIG. 4 with the left extension 42 in a fully and partially unfolded state and FIGS. 10 and 11 illustrate components of FIG. 4 with the all panels in a partially unfolded state. FIGS. 12-14 show the extension 30 is a fully unfolded state.

In FIGS. 4, 5A and 5B, the front and rear extension panels 32 and 38 are shown in their folded positions, lying generally in the same horizontal plane, extending across the upwardly facing opening 26 of grain tank 12 to each partially overlay such opening 26. When the extension 30 is folded, left and right extension panels 42 and 44 are disposed to be at least generally horizontal and to at least roughly define a horizontal plane, generally parallel to the plane in which front and rear extension panels 32 and 38 are disposed, and to overlay, in a crossways stacking arrangement, with left and right extension panels 42 and 44 such that all extension panels in a folded state substantially form a cover over the top of the upwardly facing opening 26 of the grain tank 12.

It should be appreciated and understood, however, that, in some embodiments, the left and right extension panels 42 and 44 may be designed to lie in planes that are slightly canted relative to one another, rather than in the same plane, in order to permit or provide a shingling effect, with an outer portion of the left extension panel 42 slightly overlapping the outer portion of the right extension panel 44 (not shown). Depending upon constructional details or desires of manufacturers or users, the outer portions of such left and right extension panels 42 and 44 could therefore be configured to have complementarily reduced thicknesses to accommodate such shingling and a suitable engagement between such extension panels 42 and 44 when the extension 30 is folded and to ensure better mating therebetween and a better covering of the upwardly facing opening 26 of the grain tank 12. For purposes of further discussion herein, even though the left and right extension panels 42 and 44 may thus lie in planes slightly canted to one another when the extension 30 is closed, such extension panels should still be considered to lie in generally the same plane.

A preferred embodiment of a conversion kit 100 of the present invention for converting the manually folded and unfolded extension 30 to be an automated folding and unfolding extension 30, and the operation thereof, is best illustrated in FIGS. 4-14. The conversion kit 100 includes a first bracket assembly 102, a second bracket assembly 104, a control actuator 106 and a torque rod assembly 108.

The conversion kit 100, in general, is attachable to the extension 30 and operable within the desired geometry to provide proper weight and balance to the extension 30 and to effect the unfolding and folding of extension 30 in an ordered manner. In such regard, the conversion kit 100 when assembled to the extension 30 and combine 10 is generally operable to unfold extension 30 from its folded position, as depicted in FIGS. 4 and 5A, by, initially, pivotally rotating left extension panel 42 about a generally horizontal axis of rotation 72 (FIG. 5B) along or near the top of the grain tank 12, typically through an angle greater than 90°, and often of approximately 140°, to a stop position, with the rotation of the left panel 42 about the axis of rotation 72 typically being limited by both the linkage and a positive stop at or near the front of the grain tank 12. The right extension panel 44 and the front and rear extension panels 32 and 38 are similarly caused to pivotally rotate about respective axes of rotation 74, 76 and 78 (FIG. 5B) along or near the top of the grain tank 12, also typically through an angle greater than 90°, and often of approximately 140°, to their unfolded positions. As such unfolding occurs, once the front and rear extension panels 32 and 38 have unfolded sufficiently, bubbler auger 80 (FIGS. 5B and 6) within the grain tank 12 is inclined to elevate the distal end 82 of such bubbler auger 80 within the grain tank 12 for the improved movement of grain within the grain tank 12. Folding of the extension 30 under control of the conversion kit 100 is effected by a reversal of such operations.

In the preferred embodiment depicted in FIGS. 3-14 the front and rear extension panels 32 and 38 are configured to generally be mirror image constructions of one another, each of which has an outer surface 84, an inner surface 86, and a lip portion 88 at its outer edge. As is shown in somewhat more detail in FIGS. 3, 6 and 9-12, front and rear extension panels 32 and 38 preferably include U-shaped brackets 110 extending along the inner surfaces 86 thereof from the lip portions 88 of such extension panels 32 and 38 to, and slightly beyond, the inner sides 112 (FIG. 9), with projecting portions 114 at the inner sides 112 forming part of the pivot assemblies 34 and 40 (FIG. 1) for mating such extension panels 32 and 38 with the grain tank 12. Such brackets 110 help strengthen the extension panels 32 and 38. Associated with one of such brackets 110 of each of the front and rear extension panels 32 and 38 are pin members 116 (FIG. 10) that extend laterally across the bracket 110 at an intermediate location, the purpose of which will be further addressed hereinafter. A kick shield 118 (FIG. 9) is preferably provided on the outer surface 84 of each of the front and rear extension panels 32 along the inner side 112 thereof to provide a resilient spacer upon which the left and right extension panels 42 and 44 may rest when extension 30 is folded, as in FIGS. 4 and 5A, and to act as a cushioning member when the extension 30 is unfolded and such kick shield is moved to come into contact with upper edges or portions of the grain tank 12. For purposes of clarity and simplicity of drawing, in many of the drawings hereof, kick shield 118 is not separately depicted but is considered to be part of upper surface of front and rear extension panels 32 and 38.

The control actuator, such as linear actuator 106 (FIG. 5B), is mounted behind the rear of the grain tank 12, and outside the grain tank 12 to control the folding and unfolding operations. In the depicted embodiment, such linear actuator 106 is or may include a hydraulic cylinder or an electrically powered linear actuator, and is so located, along with its associated wiring and connections, external to the grain tank 12 in order to make such construction readily accessible for easy servicing thereof even when the grain tank 12 is filled. It should be appreciated, however, that many alternative forms of control actuators could be equally as well be employed to achieve desired results, and that a linear actuator of the type herein described is but one of many possible embodiments that would be acceptable.

Referring to FIG. 5B, in the depicted conversion kit 100 such first bracket assembly 102 includes, or has associated therewith, at one end thereof, a first linkage 120 that includes a first control extension or rod 122, sometimes also referred to as the left control rod, which may preferably be physically adjustable to a desired, fixed length, operable to control the various linkage system components or linkages associated with left external panel 42, as well as, at the other end thereof, a second bracket assembly 104 that includes a second linkage 124 having a second control extension or rod 126 sometimes referred to as the right control rod, operable to control the various linkage system components or linkages associated with the right, front, and rear extension panels 44, 32 and 38 as well as the various linkage system components or linkages for positioning the bubbler auger 80 within the grain tank 12.

Left control rod 122 is operatively connected to a drive side 128 of a centrally mounted pivot member 130 that has an opposite throw side 132 operatively connected to left throw rod 134. Pivot member 130 is operably mounted for rotation about its central mounting location 136. Throw side 132 of pivot member 130 is operatively connected through throw rod 134 which is connected to the first bracket 170. The foregoing pivot member 130 and throw rod also form part of the first linkage 120.

Somewhat similarly, right control rod 126 is operatively connected to the drive side 137 of a centrally mounted pivot member 138 that has an opposite throw side 140 operatively connected to right throw rod 142. Pivot member 138 is operably mounted for rotation about its central mounting location 144. Throw side 140 of pivot member 138 is operatively connected through throw rod 142 which is connected to the second bracket 174. The foregoing pivot member 138 and throw rod 142 form part of the second linkage 124.

Well known pin connections, which may employ pin and locking pieces, such as clevis and cotter pins and the like, as well as any other constructions whose uses would achieve the intended result, can be utilized to operatively connect the various drive and throw rods to the pivot members and pivot link members to permit the proper operation of the linkages, which operations will be further addressed hereinafter. Depending upon the desires of manufacturers or users, pin connections of numerous types and variations could be equally as well employed to achieve the intended results.

Preferably, many of such noted linkage components, like control actuator 106, are mounted external to the grain tank 12 to provide ready access thereto, even when the grain tank 12 is filled, in the event of problems or the need for servicing. In such regard, it would be relatively easy to then disconnect the wiring connections from the linear actuator or to disconnect the control rods 122, 126 from the drive sides 128 and 137 of respective pivot members 130 and 138 to permit the manual opening or closing of the left and right extension panels 42 and 44.

Pivot member 138, associated with right control rod 126, is further operatively connected at its central mounting location 144 to the front/rear torque rod assembly 108 having a torque tube 109, best shown in FIGS. 6 and 14, that extends generally through at least a portion of the grain tank 12 from beyond the rear thereof towards the front of the grain tank 12 to a mounting fixture, such as the mounting fixture 146. As best shown in FIGS. 6 and 14, third and fourth linkages 148 and 150 are fixedly mounted at locations along the extent of the torque rod assembly 108 to extend outwardly therefrom and to be rotatable therewith about axis of rotation 152 (FIG. 6). First ends of throw rods 154 and 156 are operatively connected, respectively, to linkage extensions 158 and 160, and the opposite ends of such throw rods 154 and 156 are operatively connected to respective joiner constructions 162 associated with pins 116 (FIG. 14) through U-brackets 110 of front and rear extension panels 32 and 38.

As has been noted previously, pin connections of various types and configurations can be utilized for effecting operative connections between the various components. Similarly, numerous types and configurations of well known joinder constructions can be readily utilized with the throw rods 154 and 160 and pins 116 to achieve the desired operations and results.

Also associated with the torque rod assembly 108 is a further bubbler linkage extension 166 (FIG. 6) fixedly mounted along the extent of such the torque tube 109 to extend outwardly therefrom and to be rotatable therewith about axis of rotation 152. Bubbler lift rod or cable 168 operatively joins bubbler linkage extension 166 to bubbler auger 80, such as in a slide and catch arrangement, which arrangement allows some rotation of the torque tube 109 and bubbler linkage extension 166 without any consequent movement of the bubbler auger 80, followed by a lifting of the bubbler auger 80 to an inclined position after sufficient rotation has been achieved that lift rod or cable 168 is in a catch position relative to the bubbler linkage extension 166 and bubbler auger 80. In sum, the linkage extension 166 moves between first and second positions for raising and lowering the bubbler auger 80 concurrently with the torque tube 109 pivoting to move the third and fourth grain tank extensions between the folded position and the unfolded position.

The ordered unfolding of extension 30 is best understood by initial reference to FIGS. 4, 5A and 5B, which depict the extension 30 in its folded position, through, in sequence, FIGS. 4, 8, 9, 10 and 11, which depict the extension 30 at various points in its unfolding operation, to FIG. 12, which depicts extension 30 in its fully unfolded position. As has previously been noted, such unfolding occurs in sequence using the linkages of the conversion kit 100 operating within their desired geometries to provide proper weight and balance of the overall construction. When linear actuator 106 is actuated, such actuation causes control rods 122 and 126 to both seek to retract. However, the force required to begin opening or unfolding left extension panel 42 is less than the force required to begin the simultaneous opening of the right, front, and rear extension panels 44, 32 and 38. Consequently, as linear actuator 106 operates, as shown in FIG. 8, retraction of right control rod 126 causes left control rod 122 to be moved to effect opening of the left extension panel 42 until left extension panel 42 reaches its stop position, as shown in FIG. 9.

Thereafter, as control rod 126 continues to retract, the movement of control rod 126 effects a rotation of pivot member 138 about its central pivot point 144 to move throw rod 142 to cause the torque tube 109 and right extension panel 44 to be rotated towards the unfolded position of such right extension panel 44. As this is occurring, the rotation of pivot member 138 also effects rotation of the torque tube 109 (FIG. 6) and the rotation of the linkage extensions 158, 160 and bubbler linkage extension 166. Such rotation of linkage extensions 158, 160 effects movement of throw rods 154, 156 to act against front and rear extension panels 32, 38 to cause them to begin to simultaneously unfold. As such actions are occurring, the rotation of bubbler linkage extension 166 causes bubbler lift rod or cable 168 to move to its catch position and to effect the subsequent lifting of the bubbler auger towards an inclined position. FIG. 11 depicts the extension 30 in a partially unfolded position, with left extension panel 42 in its unfolded position, with right, front, and rear extension panels 44, 32 and 38 partially unfolded, and with bubbler auger 80 partially elevated.

The conversion kit 100 is preferably designed and so balanced that the right, front, and rear extension panels 44, 32 and 38 all complete their respective movements to unfolded positions at about the same time and that elevation of the bubbler auger 80 is likewise completed at about the same time. FIG. 12 depicts extension 30 in its fully unfolded position.

In general, extension 30 is designed and configured such that, when extension 30 is in its unfolded position, the weight of the bubbler auger counterbalances the weight of the right, front and rear extension panels 44, 32 and 38 so that such right, front, and rear extension panels 44, 32 and 38 will be more immediately lowered than the left extension panel 42 upon an actuation of the linear actuator 106 to fold extension 30. Upon such an actuation of linear actuator 106, as control rod 126 extends, control rods 122 and 126 thus move in the opposite order from the movement of such control rods during unfolding, resulting in an initial lowering of the bubbler auger 80 towards its nominal or stored position and the folding of the front, rear, and right extension panels 32, 38 and 44, with such lowering of the bubbler auger 80 to its nominal or stored position typically being completed first, followed by the completed folding of the front and rear extension panels 32 and 38 at about the same time and the slightly later completion of the folding of the right extension panel 44. When folding of the right extension panel 44 has been completed, sufficient force is then available to effect the necessary movement of control rod 122 to effect the folding of the left extension panel 42.

Because of such sequential, ordered unfolding and folding of extension 30, the maximum force capacity of the linear actuator can be reduced from the capacity that would be otherwise required if all the extension panels were to be unfolded or folded simultaneously. With the system described hereinabove, the maximum load on the linear actuator 106 occurs when the unfolding operation is initiated and the linkage system is attempting to lift the extension panels from their generally horizontal positions over the upwardly facing opening 26 of the grain tank 12.

As has been previously noted hereinabove, the left and right extension panels may be configured to partially overlap (not shown) one another and to matably engage with one another as they are moved to their folded positions. Such configuration of partial overlap is disclosed in U.S. Pat. No. 7,585,214, the entire disclosure of which is hereby incorporated by reference herein.

Although not required, flexible gaskets could, if desired, be employed at points of engagement of the extension panels to better seal the folded extension 30 against the penetration of rain or foreign materials at the points of engagement.

Referring back to FIG. 5B, the first bracket assembly 102 is configured as shown. The first bracket assembly 102 includes the first bracket 170 configured as a substantially planar or flat bracket and includes a first end 170a and a second end 170b opposite the second end. Preferably, the first bracket 170 is a configured as a planar quadrilateral bracket or a planar trapezoidal bracket. More preferably, the substantially planar quadrilateral bracket tapers towards the second end 170b, that is, the substantially planar quadrilateral bracket narrows as it extends from the first end 170a towards the second end 170b.

The first end 170a has a larger width than a width of the second end 170b. Preferably, the first end 170a has a width that is at least twice as large as the width of the second end 170b. Further, the width of the first end 170a extends across a face of the extension 42 a length greater then 50% of a height of the extension 42 and more preferably about a length of about 75% of the height of the extension 42.

A rib 172 extends along a longitudinal length of the first bracket 170 from the first end 170a to the second end 170b. Preferably, the first bracket 170 includes a plurality of spaced apart ribs 172 that are spaced apart in a fan-like fashion and more preferably, three spaced apart ribs 172.

The rib 172 can be a concave, a convex, or a V-shaped rib, or a hollow rib having a square, rectangle or triangular shaped cross-section. The rib 172 can also be fixedly attached to the first bracket 170 or integrally formed with the first bracket 170. Preferably, the rib 172 is a parallel-piped rib having a square cross-section that is closed on both ends and open in the middle or throughout its length.

The overall size, shape and configuration of the first bracket 170 advantageously allows for the overall conversion kit to adequately provide a means to support and lift the weight of the extension 42. That is, the combination of the planar shape and ribs 172 of the first bracket 170 provides the necessary strength to the bracket to support the operation of lifting the extension 42. The second bracket 174 is a mirror image of the first bracket 170 and configured the same as described above for the first bracket 170.

It will be appreciated by those skilled in the art that changes could be made to the embodiment described above without departing from the broad inventive concept thereof. It is to be understood, therefore, that this invention is not limited to the particular embodiment disclosed, but it is intended to cover modifications within the spirit and scope of the present invention as defined by the appended claims.

We claim:

1. A conversion kit for automating a foldable and unfoldable grain tank extension for an agricultural combine comprising:
    a first bracket assembly for attaching to a first grain tank extension, the first bracket assembly including a first bracket having a major surface for securing to a major surface of the first grain tank extension;
    a second bracket assembly for attaching to a second grain tank extension, the second bracket assembly including a second bracket having a major surface for securing to a major surface of the second grain tank extension;
    a control actuator extending between and operatively connected to the first and second bracket assemblies for moving the first and second brackets between a folded position and an unfolded position; and
    a torque rod assembly extending between and connected to third and fourth grain tank extensions, wherein the torque rod assembly includes a torque tube connected to the control actuator about a pivot member and extending between the third and fourth grain tank extensions.

2. The conversion kit of claim 1, wherein the first bracket assembly further comprises a first linkage for connecting the first elongated bracket to the control actuator, and wherein the second bracket assembly further comprises a second linkage for connecting the second elongated bracket to the control actuator.

3. The conversion kit of claim 1, wherein the control actuator is configured to move between a retracted position and an extended position, wherein in moving from the extended position to the retracted position the first and second grain tank extension move from the folded position to the unfolded position.

4. The conversion kit of claim 1, wherein the torque rod assembly further comprises a third linkage for connecting to the third grain tank extension and a fourth linkage for connecting to a fourth grain tank extension.

5. The conversion kit of claim 1, wherein the first and second brackets are each configured as a substantially planar quadrilateral bracket having a first end connectable to the first grain tank extension and a second end operatively connected to the control actuator.

6. The conversion kit of claim 5, wherein the first and second brackets each include at least one rib extending from the first end to the second end of the substantially planar quadrilateral bracket.

7. The conversion kit of claim 5, wherein the first end has a larger width than a width of the second end.

8. The conversion kit of claim 5, wherein the first end has a width dimension at least twice a width dimension of the second end.

9. The conversion kit of claim 5, wherein the substantially planar quadrilateral bracket tapers towards the second end.

10. The conversion kit of claim 5, wherein the substantially planar quadrilateral bracket is configured as a substantially trapezoidal planar bracket.

11. The conversion kit of claim 1, wherein the torque rod assembly further includes linkage extension extending from the torque tube for attaching to a bubbler auger of the agricultural combine, wherein the linkage extension moves between first and second positions concurrently with the torque tube pivoting to move the third and fourth grain tank extensions between the folded position and the unfolded position.

12. A conversion kit for automating a foldable and unfoldable grain tank extension for an agricultural combine comprising:
    a first bracket assembly for attaching to a first grain tank extension, the first bracket assembly including:
        a first planar trapezoidal-shaped bracket for securing to the first grain tank extension, and
        a first linkage for linking to the first bracket;
    a second bracket assembly for attaching to a second grain tank extension, the second bracket assembly including:
        a second planar quadrilateral-shaped bracket for securing to the second grain tank extension, and
        a second linkage for linking to the second bracket;
    a control actuator extending between and operatively connected to the first and second linkages for moving the first and second brackets between a folded position and an unfolded position; and
    a torque rod assembly operatively connected to third and fourth grain tank extensions and the control actuator, wherein the torque rod assembly includes:
        a torque tube extending between the third and fourth grain tank extensions, and
        third and fourth linkages for linking the torque tube to the third and fourth grain tank extensions, wherein the torque tube is rotatable to pivotally move the third and fourth grain tank extensions between a folded position and an unfolded position.

13. The conversion kit of claim 12, wherein the first bracket has a first end connectable to the first grain tank extension and a second end connected to the first linkage, and wherein the second bracket has a first end connectable to the second grain tank extension and a second end connected to the second linkage.

14. The conversion kit of claim 13, wherein the first and second brackets each include at least one rib extending from the first end to the second end.

15. The conversion kit of claim 13, wherein the first end has a larger width than a width of the second end.

16. The conversion kit of claim 13, wherein the first end has a width dimension at least twice a width dimension of the second end.

17. The conversion kit of claim 13, wherein the planar quadrilateral-shaped bracket tapers towards the second end.

18. An automated un-foldable and foldable extension for increasing the grain holding capacity of a grain tank of an agricultural combine comprising:
   a plurality of extension panels mounted for pivotal movement about the grain tank;
   a first bracket assembly for attaching to a first extension panel, the first bracket assembly including:
      a first fan-shaped bracket having a plurality of ribs spaced apart in a fan-like configuration for securing to the first extension panel, and
      a first linkage for linking to the first fan-shaped bracket;
   a second bracket assembly for attaching to a second extension panel, the second bracket assembly including:
      a second bracket for securing to the second extension panel, and
      a second linkage for linking to the second bracket;
   a control actuator extending between and operatively connected to the first and second linkages for moving the first and second brackets between a folded position and an unfolded position; and
   a torque rod assembly operatively connected to third and fourth extension panels and the control actuator, wherein the torque rod assembly includes:
      a torque tube extending between the third and fourth extension panels, and
      third and fourth linkages for linking the torque tube to the third and fourth extension panels, wherein the torque tube is rotatable to pivotally move the third and fourth extension panels between a folded position and an unfolded position.

19. The automated un-foldable and foldable extension of claim 18, wherein the first fan-shaped bracket has a first end connectable to the first extension panel and a second end connected to the first linkage, and wherein the second bracket has a first end connectable to the second extension panel and a second end connected to the second linkage.

20. The automated un-foldable and foldable extension of claim 19, wherein each of the plurality of ribs extends from the first end to the second end of the fan-shaped bracket.

21. The automated un-foldable and foldable extension of claim 19, wherein the first end has a width dimension at least twice a width dimension of the second end.

* * * * *